US005905735A

United States Patent [19]
Wille

[11] Patent Number: 5,905,735
[45] Date of Patent: May 18, 1999

[54] TIME SLOT INTERCHANGER AND DIGITAL COMMUNICATIONS TERMINAL FOR ISDN D-CHANNEL ASSEMBLY

[75] Inventor: David G. Wille, Plano, Tex.

[73] Assignee: Alcatel USA Sourcing, L.P., Plano, Tex.

[21] Appl. No.: 08/759,391

[22] Filed: Dec. 4, 1996

[51] Int. Cl.$^6$ .................................................. H04J 3/16
[52] U.S. Cl. ........................................ 370/524; 370/376
[58] Field of Search .................................... 370/375, 376, 370/377, 324, 378, 420, 419, 351, 530, 524, 401, 264, 265, 278, 381, 379, 522; 379/201, 207, 419

[56] References Cited

U.S. PATENT DOCUMENTS

| | | | |
|---|---|---|---|
| 3,740,483 | 6/1973 | Pedersen | 370/376 |
| 5,157,656 | 10/1992 | Turudic et al. | 370/379 |
| 5,640,387 | 6/1997 | Takahashi et al. | 370/376 |

OTHER PUBLICATIONS

M.J.M. Forbes et al. Integrated Access: The Achievement of a Vision, IEEE 2081–2086, 1991.

Arvidson et al., A Generic Digital Switch Interface(TR–303) for Local Access, IEEE 2087–2091, 1991.

Kim et al., Flexibility and Quality in the Access Network, IEEE 1864–1868, 1992.

Bellcore Information, Bellcore: GR–303 Integrated Access Platforms, Mar. 3, 1998.

*Primary Examiner*—Jason Chan
*Assistant Examiner*—Jasper Kwoh
*Attorney, Agent, or Firm*—Baker & Botts, L.L.P.

[57] ABSTRACT

The invention comprises a time slot interchanger and method for multiplexing ISDN D-channel signals into multiplexed signals in a digital communications terminal. One method comprises receiving a frame of communication signals wherein some of the communication signals represent ISDN D-channel signals wherein each ISDN D-channel signal is represented by a first number of data bits and a second number of other bits. The first number of data bits are stored in one of four memories—a first memory, second memory, third memory or fourth memory. The data bits are stored during a first frame period. Multiplexed signals are then assembled wherein a multiplexed signal comprises a multiplexed combination of the data bits of ISDN D-channel signals retrieved from the frame of communications signals. The multiplexed signals are assembled by storing the data bits of at least two ISDN D-channel signals, each set of data bits stored at the same memory address but in a separate one of the first, second, third or fourth memories.

20 Claims, 3 Drawing Sheets

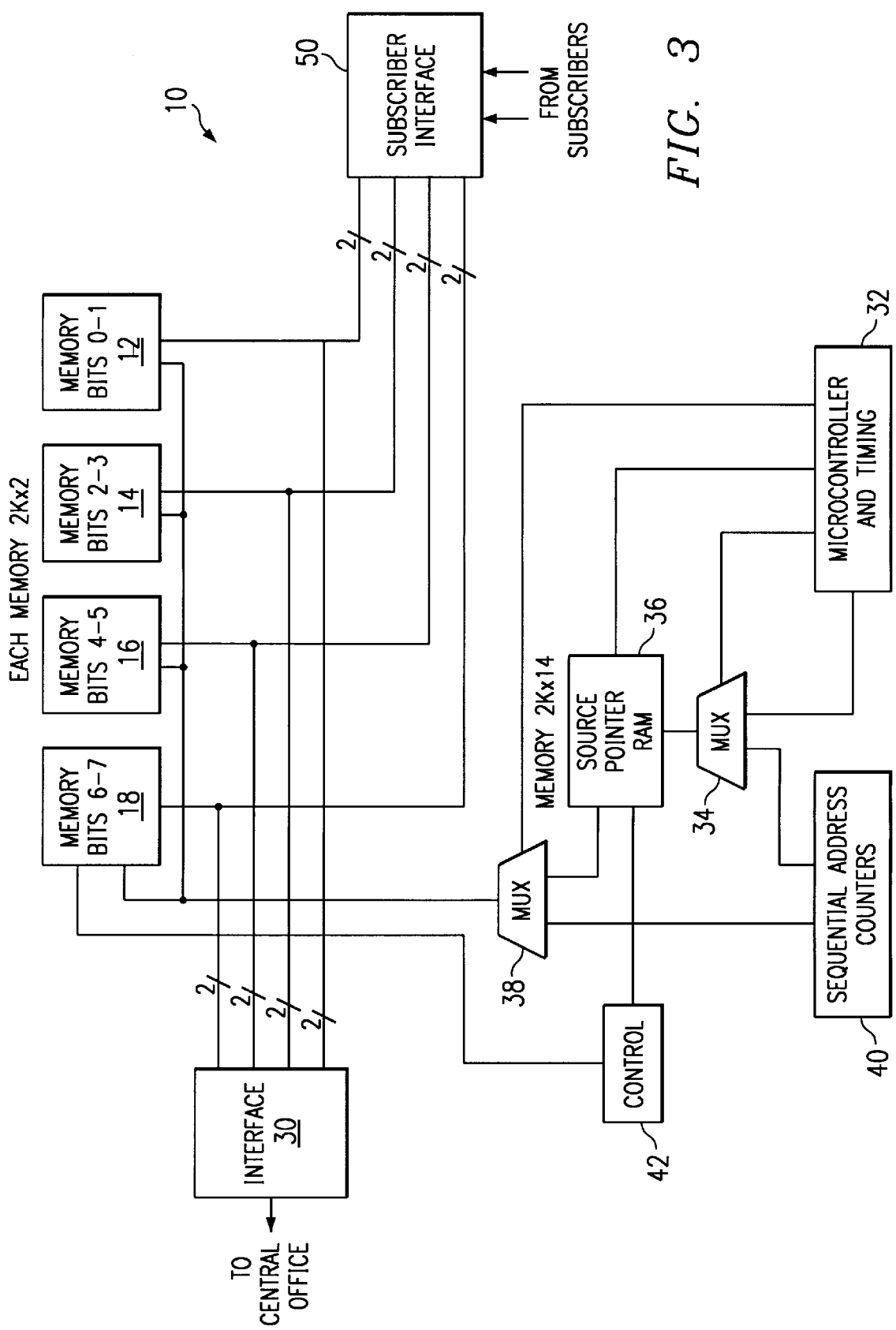

TIME SLOT INTERCHANGER AND DIGITAL COMMUNICATIONS TERMINAL FOR ISDN D-CHANNEL ASSEMBLY

CROSS REFERENCE TO RELATED APPLICATIONS

This application is related to U.S. application Ser. No. 08/759,390, filed on Dec. 4, 1996 by David G. Wille, et al., attorney's docket number 036560.5282, and entitled, "Time Slot Interchanger and Digital Communications Terminal for ISDN D-Channel Assembly".

This application is related to U.S. application Ser. No. 08/754,000, filed on Dec. 4, 1996 by David G. Wille, et al., attorney's docket number 036560.5283, and entitled, "Time Slot Interchanger and Digital Communications Terminal for ISDN D-Channel Assembly".

This application is related to U.S. application Ser. No. 08/759,187, filed on Dec. 4, 1996 by David G. Wille, et al., attorney's docket number 036560.5284, and entitled, "Time Slot Interchanger and Digital Communications Terminal for ISDN D-Channel Assembly."

TECHNICAL FIELD OF THE INVENTION

This invention relates generally to telecommunications and more particularly to a method and apparatus for multiplexing ISDN D-channel signals in a digital communications terminal.

BACKGROUND OF THE INVENTION

Bellcore has developed a series of requirements for telecommunications equipment manufacturers to follow when interfacing a digital loop carrier with a class V central office switch. These requirements are collected in Bellcore document TR-303.

One of the requirements of TR-303 concerns assembly of a plurality of Integrated Services Digital Network (ISDN) D-channel signals into a single DSO signal. TR-303 now requires that up to four ISDN D-channel signals be multiplexed together to form a single DSO signal for transport from a digital loop carrier to a class V central office switch.

An ISDN signal comprises two B-channel and one D-channel signal. Each B-channel signal comprises an 8-bit signal while the D-channel signal comprises a 2-bit signal. Because the 8-bit DSO signal has been the traditional base unit of transport for the telephone system, ISDN D-channel signals often consume an entire 8-bit DSO signal. Transporting individual D-channel signals in a DSO signal wastes three-fourths of the bandwidth for that particular DSO.

The requirements of TR-303 seek to utilize bandwidth more efficiently. In accordance with TR-303, one to four ISDN D-channel signals may be multiplexed together and carried in a single DSO signal between the digital loop carrier and the central office class V switch. This TR-303 requirement reduces wasted bandwidth between a digital loop carrier and a class V central office switch, particularly where a large number of ISDN lines are connected to the digital loop carrier.

SUMMARY OF THE INVENTION

One aspect of the invention is a method and apparatus for multiplexing ISDN D-channel signals into multiplexed signals. Another aspect of the invention is a digital communications terminal that assembles ISDN D-channel signals in accordance with the method of the invention. The method comprises receiving a frame of communication signals wherein some of the communication signals represent ISDN D-channel signals and each ISDN D-channel signal is represented by a first number of data bits and a second number of other bits. The first number of data bits of communication signals representing ISDN D-channel signals are stored in a one of four memories, a first memory, a second memory, a third memory or a fourth memory. The storing step occurs during a first frame period. A multiplexed signal is assembled comprising a multiplexed combination of the data bits of ISDN D-channel signals from the frame of communication signals. The multiplexed signals are assembled by storing the data bits of at least two ISDN D-channel signals, each set of data bits stored at the same memory address but in a separate one of the first, second, third or fourth memories.

The invention has several important technical advantages. The invention allows a digital loop carrier to meet the requirements of TR303 for ISDN D-channel assembly. Assembly may be accomplished using the time slot interchanger of the digital loop carrier. The invention may also be used in any type of digital communications terminal. Utilization of a time slot interchanger for D-channel assembly makes efficient use of a digital communications terminal's hardware because the time slot interchanger may also be used in its traditional role as a time slot interchanger. The invention allows the manufacturer of an existing digital loop carrier to easily redesign its time slot interchanger in a time and cost efficient manner in order to meet the requirements of TR303. The invention achieves multiplexing of D-channel signals without adding additional frames of time delay to the D-channel signals.

BRIEF DESCRIPTION OF THE DRAWINGS

For a more complete understanding of the present invention and the advantages thereof, reference is now made to the following descriptions taken in conjunction with the accompanying drawings in which:

FIG. 3 illustrates a block diagram of a third embodiment of the time slot interchanger portion of a digital communications terminal constructed in accordance with the invention.

DETAILED DESCRIPTION OF THE INVENTION

Figure 1:
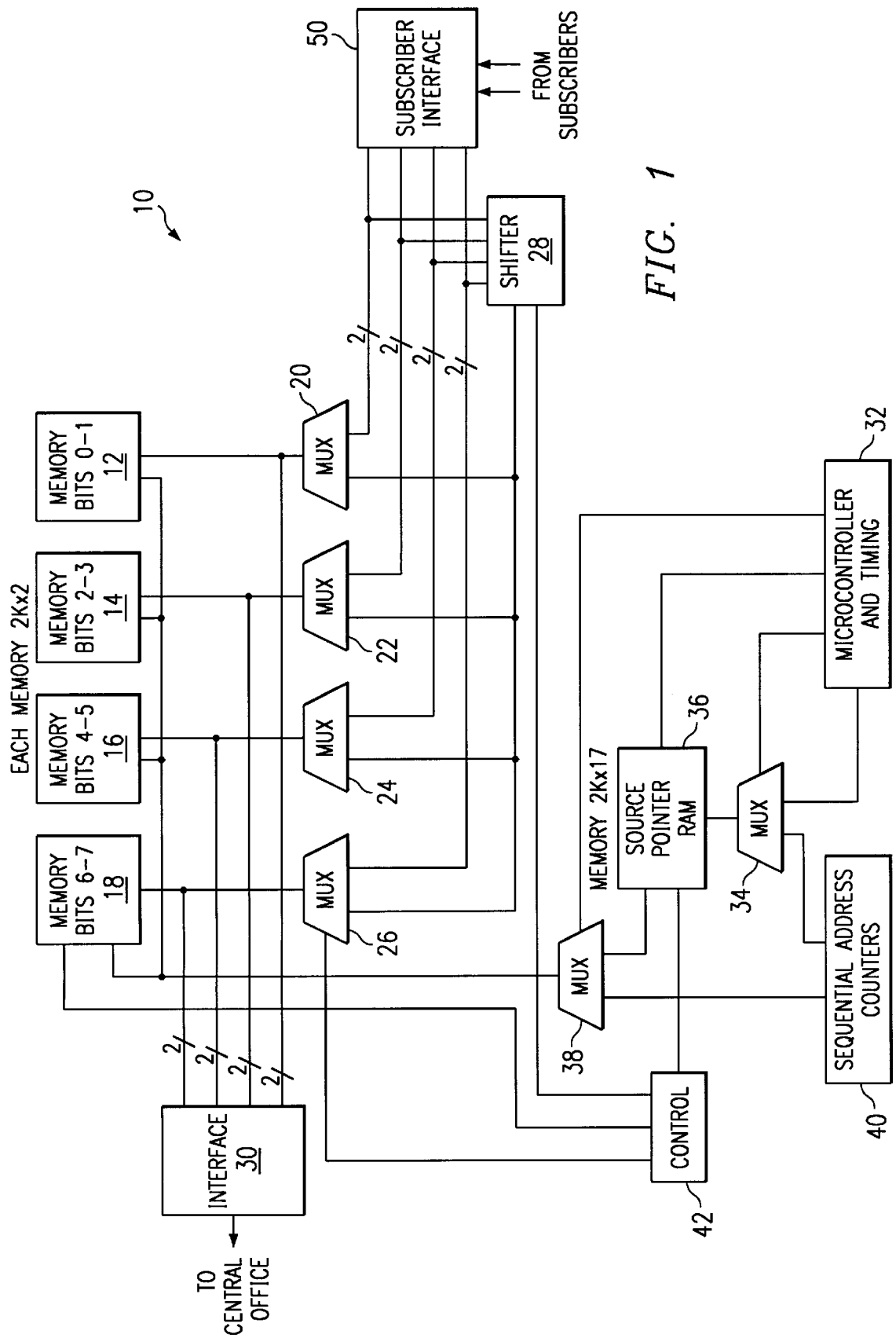
FIG. 1 illustrates a block diagram of a first embodiment of a time slot interchanger portion of a digital communications terminal constructed in accordance with the invention.
Figure 2:
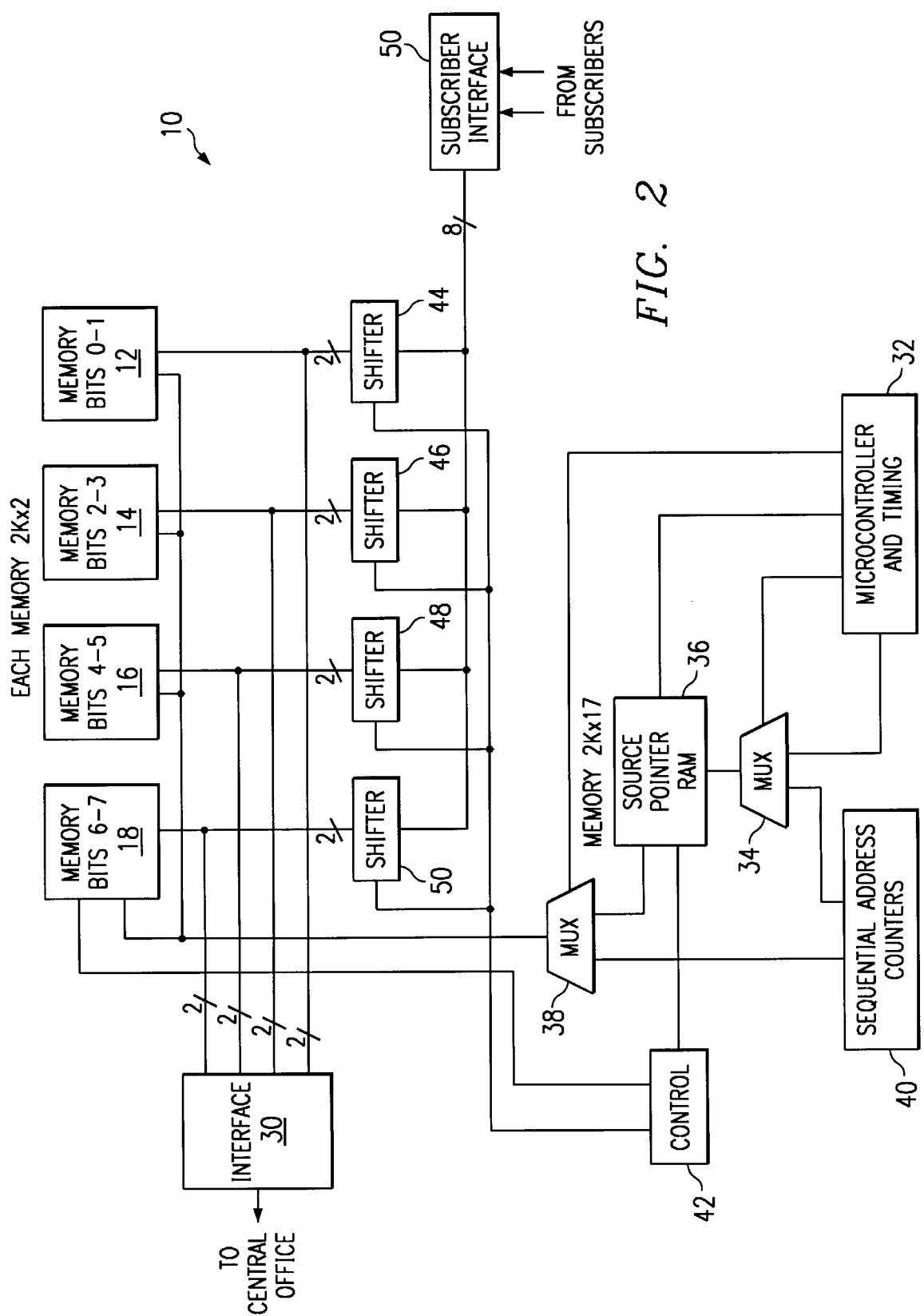
FIG. 2 illustrates a block diagram of a second embodiment of the time slot interchanger portion of a digital communications terminal constructed in accordance with the invention.

The preferred embodiment of the present invention and its advantages are best understood by referring to FIGS. 1 through 3 of the drawings, like numerals being used for like and corresponding parts of the various drawings.

FIG. 1 illustrates an embodiment of a time slot interchanger 10 that may be used to multiplex ISDN D-channel signals in accordance with the invention. For purposes of this description, the terms "ID-channel" and "1/4 DSO" are used interchangeably and refer to the 2-bit portion of an ISDN signal. Time slot interchanger 10 is capable of performing a time slot interchange function on a plurality of signals received from a subscriber interface and sent to a central office interface. Although this function will not be described in detail, it should be understood that time slot interchanger 10 may perform any function performed by an existing time slot interchanger as well as the functions of the invention. For example, time slot interchanger 10 may employ the power conservation techniques disclosed in U.S. Pat. No. 5,260,937 issued to Thomas R. Eames and Lac Trinh and assigned to DSC Communications Corporation, which is hereby incorporated by reference as if fully set forth herein. Although this example performs assembly of D-channel signals between subscribers and a central office, the invention could be used anywhere in a communications network.

Time slot interchanger 10 comprises first time slot interchanger memory 12, second time slot interchanger memory 14, third time slot interchanger memory 16, fourth time slot interchanger memory 18, multiplexers 20, 22, 24, & 26, shifter 28, and interface 30. The time slot interchanger memories 12, 14, 16, & 18, in this example, are 2K by 2 memories which may be used for interchanging over 2,000 DSO communication signals. Different sized memory may be used without departing from the scope of the invention. Time slot interchanger memories 12, 14, 16, & 18 receive signals from a subscriber interface 50. In this embodiment, DSOs are written into the time slot interchanger memories 12, 14, 16, & 18 in random order and read out of time slot interchanger memories 12, 14, 16, & 18 in consecutive order to achieve the time slot interchange function.

The invention employs four 2-bit memory banks. The use of four 2-bit memory banks allows time slot interchanger 10 to individually control four separate bit pairs for a given memory address. Controlling four separate bit pairs allows time slot interchanger 10 to place D-channel signals in their proper position for sending to the central office. A particular memory location (address) in each of the time slot interchanger memories 12, 14, 16, & 18 is associated with a source pointer in source pointer RAM 36. In this embodiment, then, one source pointer is used to control the same address in all four time slot interchanger memories 12, 14, 16, & 18. Additional source pointers could be used to control time slot interchanger memories 12, 14, 16, & 18 without departing from the scope of the invention. The structure of the source pointers used to achieve the time slot interchange function for time slot interchanger 10 will be discussed more fully below.

Some of the signals received from the subscriber interface and written into the time slot interchanger memories 12, 14, 16, & 18 are ISDN D-channel signals. ISDN D-channel signals pass through shifter 28 and one of the multiplexers 20, 22, 24, & 26 before being stored in one of the time slot interchanger memories 12, 14, 16, & 18. Shifter 28 receives an 8-bit input and is capable of shifting any pair of consecutive bits to its outputs. In this embodiment, shifter 28 receives its input from the subscriber interface and its output is connected to inputs on each of the multiplexers 20, 22, 24, & 26. Control circuitry 42 provides control signals to shifter 28 to indicate which pair of consecutive bits (potentially including bit pair 7 and 0) to shift to the output of shifter 28.

Time slot interchanger memories 12, 14, 16, & 18, multiplexers 20, 22, 24, & 26 and shifter 28 are used to multiplex between one and four D-channel signals into a multiplexed DSO signal. The invention accomplishes the multiplexing of D-channel signals by shifting a D-channel signal received from the subscriber interface into proper position using shifter 28. Multiplexers 20, 22, 24, & 26 then provide the output of shifter 28 to each of the memories 12, 14, 16, & 18. Based upon data from the source pointer in source pointer RAM 36, control circuitry 42 enables only one of the time slot interchanger memories 12, 14, 16 or 18 to receive the output of the shifter. Accordingly, when a D-channel signal is received from the subscriber interface, the 2-bit data portion of the D-channel signal is written directly to one of the 2-bit time slot interchanger memories 12, 14, 16, & 18. The contents of the memory at the same address in the other time slot interchanger memories are left unchanged. Thus, the ability to store 2 bits at a particular memory address while leaving the remaining 6 bits of that address unchanged allows time slot interchanger 10 to assemble a multiplexed DSO signal by storing each of up to four D-channel signals, 2 bits at a time. The D-channel signals may be received at any point in a frame of communication signals received from the subscriber interface.

In this embodiment of the invention, then, when a D-channel signal is received from the subscriber interface, only 2 bits of the 8-bit signal will be stored—the D-channel bits. The remaining 6 bits are discarded. The D-channel bits are stored in the appropriate time slot interchanger memory 12, 14, 16 or 18 based upon the source pointer for that time slot. Shifter 28 shifts the D-channel bits to the shifter output for storage in the appropriate memory. Because only one D-channel signal arrives at any one time, only one shifter is needed. An alternative embodiment of the invention might include multiple D-channel signals in a single byte. In such an embodiment, additional shifters 28 could be provided to handle the shifting operation. The D-channel signal is stored in the same position as that D-channel signal will occupy when sent to the central office after passing through interface 30.

Multiplexers 20, 22, 24, & 26 determine whether time slot interchanger memories 12, 14, 16, & 18 receive their input from either the subscriber interface or the output of shifter 28. Multiplexers 20, 22, 24, & 26 are controlled by control circuitry 42. They will pass the subscriber interface data to the time slot interchanger memories 12, 14, 16, & 18 when the byte being received is an ordinary DSO signal or other 8-bit signal. When a D-channel signal is received, multiplexers 20, 22, 24, & 26 will pass the output of shifter 28 to time slot interchanger memories 12, 14, 16, & 18.

Time slot interchanger 10 also includes circuitry used to control time slot interchanger memories 12, 14, 16, & 18, multiplexers 20, 22, 24, & 26 and shifter 28. This circuitry includes microcontroller and timing circuitry 32, multiplexer 34, source pointer RAM 36, multiplexer 38, sequential address counters 40, and control circuitry 42.

Microcontroller and timing circuitry 32 oversees the control and timing of time slot interchanger 10. Microcontroller and timing circuitry 32 controls the interchange of time slots utilizing source pointers stored in the appropriate location in source pointer RAM 36. Multiplexer 34 provides an address to source pointer RAM 36 either from microcontroller and timing circuitry 32, or from sequential address counters 40. Source pointer RAM 36 receives its address inputs from microcontroller and timing circuitry 32 when the digital communications terminal is setting up a connection for a particular time slot. Microcontroller and timing circuitry 32 stores the appropriate pointer in source pointer RAM 36. During the operation of time slot interchanger 10, source pointer RAM 36 receives its address inputs from sequential address counters 40.

First time slot interchanger memory 12, second time slot interchanger memory 14, third time slot interchanger memory 16, and fourth time slot interchanger memory 18 receive their address inputs from multiplexer 38. In this embodiment, multiplexer 38 provides the same address to each of the time slot interchanger memories 12, 14, 16, & 18. The number of address lines multiplexed by multiplexer 38 will vary depending upon the size of time slot interchanger memories 12, 14, 16, & 18. Multiplexer 38 provides either the output of sequential address counters 40 or source pointer RAM 36 as the address input to the time slot interchanger memories 12, 14, 16, & 18. Because time slot interchanger 10 comprises a random write/consecutive read time slot interchanger, time slot interchanger memories 12, 14, 16, & 18 receive their address inputs from source pointer RAM 36 while data is being written into time slot interchanger memories 12, 14, 16, & 18 and receive their address inputs from sequential address counters 40 when data is being read from time slot interchanger memories 12, 14, 16, & 18.

Control circuitry 42 determines whether the output of shifter 28 or data from the subscriber interface is passed to the time slot interchanger memories 12, 14, 16, & 18. Control circuitry 42 also determines which banks of the time slot interchanger memories 12, 14, 16 and/or 18 are enabled during a particular time slot. Control circuitry 42 also controls multiplexers 20, 22, 24, & 26.

In operation, a digital communications terminal receives a frame of communication signals wherein some of the communication signals represent ISDN D-channel signals. The frame of communication signals is stored in the time slot interchanger memories 12, 14, 16, & 18 during a first frame period. Not all of the bits of the frame are stored. Extraneous bits carried along with an ISDN D-channel signal are discarded. The frame is received through a subscriber interface 50. During a second frame period, at least some of the stored communication signals are retrieved from the time slot interchanger memories 12, 14, 16, & 18 and sent to interface 30. Interface 30 may then latch a particular byte of data in or simply pass it to an interface to the central office.

Because this embodiment of time slot interchanger 10 is a random write/consecutive read time slot interchanger, data is stored in time slot interchanger memories 12, 14, 16, & 18 in an order that is normally different from the order in which it was received from the subscriber interface. The data is read out of time slot interchanger memories 12, 14, 16, & 18 in consecutive order. Thus, when the data is stored in time slot interchanger memories 12, 14, 16, & 18, the data occupies a position in the time slot interchanger memories 12, 14, 16, & 18 relative to other data stored in those memories that corresponds to the same position relative to other data that the data will occupy when passing through interface 30 and being sent to the central office.

The operation of time slot interchanger 10 for an ordinary DSO signal is as follows. The full 8 bits of the ordinary DSO are received from the subscriber interface. The least significant 2 bits of the DSO pass through multiplexer 20 to first time slot interchanger memory 12. The second least significant pair of bits of the DSO passes through multiplexer 22 to second time slot interchanger memory 14. Bits 4 and 5 of the DSO pass through multiplexer 24 to third time slot interchanger memory 16. The most significant pair of bits of the DSO pass through multiplexer 26 to time slot interchanger memory 18. Therefore, the full 8 bits of an ordinary DSO are passed through the multiplexers 20, 22, 24, & 26 directly to the four time slot interchanger memories 12, 14, 16, & 18. The full 8 bits are stored in the memories, 2 in each memory bank.

To assemble up to four D-channel signals into a single DSO in accordance with the invention, the D-channel signals are received one at a time from the subscriber interface and each is stored in the appropriate location in one of the time slot interchanger memories 12, 14, 16, & 18 as it is received. Only the D-channel bits are stored and the remaining bits of a byte containing a D-channel signal are discarded. Those bits are stored in the appropriate time slot interchanger memory 12, 14, 16, or 18 based upon the source pointer for that time slot. If a multiplexed DSO is to contain four D-channel signals, then each D-channel will be stored in a different one of the time slot interchanger memories 12, 14, 16, & 18 as it is received from the subscriber interface.

In this embodiment, each time slot in a frame for time slot interchanger 10 is associated with a source pointer stored in source pointer RAM 36. In this embodiment, each source pointer is 17 bits wide, so source pointer RAM 36 comprises a 2K by 17 memory. Each source pointer comprises a series of address bits indicating the source address—11 bits in this example for a 2K by 2K time slot interchanger. The source pointer further comprises D-channel source bits indicating which bit pair within a byte containing a D-channel signal actually contains the D-channel information. In other words, the invention allows the D-channel information to be placed in bits 0:1, 1:2, 2:3, 3:4, 4:5, 5:6, 6:7, or 7:0 of the DSO signal received from a subscriber. This feature of the invention allows flexibility in designing interface circuitry for subscribers. The source pointer in this embodiment also includes a control bit indicating whether a particular byte to be read is a DSO or a D-channel signal. This control bit may be used in controlling multiplexers 20, 22, 24, & 26, shifter 28, time slot interchanger memories 12, 14, 16, & 18, and control circuitry 42. The source pointer of this embodiment further comprises two bank enable bits that are used to indicate in which bank of time slot interchanger memory 12, 14, 16, & 18 to store a D-channel signal. During storage of a D-channel signal, one of the four banks of memory will be enabled. During storage of a DSO signal, all banks of memory are enabled. Other bits could be included or some of the described bits omitted from the source pointer without departing from the scope of the invention.

The time slot interchanger memories 12, 14, 16, & 18 could each be divided into a section for odd frames and a section for even frames as is commonly known in the art. This technique could be used with any of the embodiments discussed herein.

Focusing now on the processing of an entire frame, a frame of communication signals received from a subscriber interface is stored randomly in the time slot interchanger memories 12, 14, 16, & 18 during a first frame period. During a second frame period, these communication signals are read out of time slot interchanger memories 12, 14, 16, & 18 in consecutive order in order to achieve an interchange of those signals. For a given time slot in the frame that is received from a subscriber, the time slot interchanger memories 12, 14, 16, & 18 will either receive an ordinary DSO signal or a 2-bit D-channel signal that is stored in one of the of the four time slot interchanger memories 12, 14, 16, & 18. Over the course of a frame, multiple D-channel signals may be stored at the same memory location (address) in different banks of the time slot interchanger memories 12, 14, 16, & 18, thus creating a plurality of multiplexed ISDN D-channel signals. During the second frame period, interface 30 receives the appropriate signals in consecutive order. The order of storage of the data received from the subscriber interface is controlled by source pointers stored in the source pointer RAM 36.

FIG. 2 illustrates a second embodiment of a time slot interchanger 10 that may be used in a digital communications terminal to multiplex ISDN D-channel signals into multiplexed signals in accordance with the invention. Time slot interchanger 10 of FIG. 2 differs from the embodiment illustrated in FIG. 1 in that multiplexers 20, 22, 24, & 26 as well as shifter 28 have been omitted. Instead, multiplexers 20, 22, 24, & 26 have been replaced by shifters 44, 46, 48, & 50. Ordinary DSO signals as well as D-channel signals pass through shifters 44, 46, 48, & 50. The differences between the embodiment of time slot interchanger 10 of FIG. 2 and the embodiment of FIG. 1 can best be understood by examining the operation of the embodiment illustrated in FIG. 2.

The shifters 44, 46, 48, & 50 are similar to shifter 28 in that they are capable of shifting any pair of consecutive bits to their output. Here, however, each shifter 44, 46, 48, & 50 is slightly different. Shifters 44, 46, 48, & 50 are designed to facilitate simple processing of DSOs. When a DSO is received from the subscriber interface, shifters 44, 46, 48, & 50 simply act as a pass-through mechanism to pass the relevant 2 bits through to the time slot interchanger memories 12, 14, 16, & 18. In other words, shifter 44 passes bits 0 and 1 to first time slot interchanger memory 12. Shifter 46 passes bits 2 and 3 of the DSO through to second time slot interchanger memory 14. Shifter 48 passes bits 4 and 5 of the DSO to third time slot interchanger memory 16. Shifter 50 passes bits 6 and 7 of the DSO to fourth time slot interchanger memory 18.

To simplify the design of control circuitry 42 and minimize the number of bits in the source pointer RAM associated with controlling shifters 44, 46, 48, & 50, the shifters are designed such that a single control code causes the shifting just described for an ordinary DSO. This can be accomplished by making the design of shifters 44, 46, 48, & 50 slightly different or simply by connecting the 8-bit lines from the subscriber interface in a different order on the inputs of each of the shifters 44, 46, 48, & 50. D-channel signals are processed similarly to the way they are processed in the embodiment in FIG. 1. In this embodiment, the shifter 44, 46, 48 or 50 corresponding to the memory bank in which the D-channel signal will be stored appropriately shifts the byte received from the subscriber interface to produce the D-channel signal on its output. The source pointer for this embodiment may be the same as the source pointer for the embodiment illustrated in FIG. 1. The source pointer could also be different without departing from the scope of the invention.

FIG. 3 illustrates a third embodiment of a time slot interchanger 10 that may be used in a digital communications terminal to multiplex ISDN D-channel signals into multiplexed signals in accordance with the invention. Time slot interchanger 10 of FIG. 3 differs from the embodiments illustrated in FIGS. 1 and 2 in that the multiplexers 20, 22, 24, & 26 and shifters 28, 44, 46, 48, & 50 have been omitted. Instead, 2 bits of the 8-bit byte received from the subscriber interface are connected to each of the time slot interchanger memories 12, 14, 16, & 18. The differences between the embodiment of time slot interchanger 10 of FIGS. 1 and 2 and the embodiment of FIG. 3 can best be understood by examining the operation of the embodiment illustrated in FIG. 3.

In the embodiment illustrated in FIG. 3, DSOs received from the subscriber interface are stored in the time slot interchanger memories 12, 14, 16, & 18 by storing two bits in each memory. When a D-channel signal is received, only one of the banks of time slot interchanger memory 12, 14, 16, & 18 is enabled and the D-channel signal is stored in that memory bank. Here, however, because there is no apparatus for shifting the D-channel signal into its proper 2-bit position, the D-channel signal received from the subscriber interface is placed in its proper 2-bit position before it is received by time slot interchanger 10. For example, the D-channel signals may be placed in the proper 2-bit position by ISDN line cards or by the subscriber interface of the digital communications terminal.

The "proper 2-bit position" refers to the position of the D-channel signal after it has passed through time slot interchanger 10 and has been placed in a multiplexed DSO signal for transmission to the central office through interface 30. Line cards may be made programmable such that any ISDN D-channel signal can be placed into bit pair 0:1, 2:3, 4:5 or 6:7 of a DSO for transport to the digital communications terminal. Because the D-channel signals are already in proper position within the byte when they are received by time slot interchanger 10, multiplexers 20, 22, 24, & 26 and shifters 28, 44, 46, 48, & 50 may be omitted. The source pointer for this embodiment may omit the D-channel source bits as the D-channel data bits are already in proper position for transmission to the central office when received by time slot interchanger 10.

It should be understood that the term "control circuitry" is a broad term referring simply to circuitry used to control other circuitry. The term is broadly intended to include the direct use of bits from source pointer RAM 36 to control time slot interchanger 10. The term, "latching," in this application is also used broadly to refer to the act of storing data for a period of time. The term refers to capturing of data whether components such as interface 30, shifters 28, 44, 46, 48, & 50 or multiplexers 20, 22, 24, & 26 latch data using a latching function, latch data using a flip flop type function, or latch data in some other manner. Of course, any or all of these components may not latch the data but may simply act as combinational circuitry if the circuitry to which it is connected is fast enough.

One embodiment of the invention involves storing data bits of ISDN D-channel signals in one of the time slot interchanger memories 12, 14, 16 or 18 in the same position that those signals will occupy within one of the multiplexed signals. The term "same position" refers to the position of data bits within the time slot interchanger memories 12, 14, 16, & 18 relative to other data bits. The time slot interchanger memories 12, 14, 16, & 18 could also include other bits such as error detection/correction bits without departing from the scope of the invention.

Although the invention is illustrated in the context of assembling D-channel signals from subscribers destined for a central office, the invention could be used at any point in a telecommunications system. For example, assembly could occur within a class V central office switch itself.

Although the present invention has been described in detail, it should be understood that various changes, substitutions, and alterations can be made hereto without departing from the spirit and scope of the invention as defined by the appended claims.

What is claimed is:

1. A time slot interchanger, comprising:
   a first interface operable to receive a first frame of communication signals, wherein some of the communication signals represent ISDN D-channel signals, each ISDN D-channel signal represented by a first number of data bits and a second number of other bits and wherein some of the communication signals represent DSO signals;
   a first memory, second memory, third memory, and fourth memory coupled to the first interface;

control circuitry coupled to the first, second, third, and fourth memories and operable to cause the first number of data bits of each ISDN D-channel signal to be stored in a single one of the four memories, the control circuitry further operable to cause the memories to output at least some of the stored bits of the communication signals during a second frame period; and a second interface coupled to the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories.

2. The time slot interchanger of claim 1, wherein the control circuitry is further operable to cause a DSO signal to be stored in the first, second, third, and fourth memories, two bits of the DSO signal per memory.

3. The time slot interchanger of claim 1, wherein the first number of data bits of each communication signal received by the first interface that represent an ISDN D-channel signal occupy the same bit positions within the communication signal when received by the first interface as they will occupy in one of the multiplexed signals.

4. The time slot interchanger of claim 1, wherein each of the memories is two bits wide.

5. A time slot interchanger, comprising:

a first interface operable to receive a first frame of communication signals, wherein some of the communication signals represent ISDN D-channel signals, each ISDN D-channel signal represented by a first number of data bits and a second number of other bits and wherein some of the communication signals represent DSO signals;

a first memory, second memory, third memory, and fourth memory coupled to the first interface;

control circuitry coupled to the first, second, third, and fourth memories and operable to cause the first number of data bits of each ISDN D-channel signal to be stored in one of the four memories, the control circuitry further operable to cause the memories to output at least some of the stored bits of the communication signals during a second frame period; and a second interface coupled to the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories, wherein each of the communication signals comprise bits D0 through D7;

the time slot interchanger further comprising:

a shifter comprising a first input and a first output, the first input coupled to the first interface, the shifter controlled by the control circuitry and operable to receive an input communication signal from the first interface and produce the first output comprising two selected bits of the input communication signal, wherein the two selected bits are selected in response to one or more bits of a source pointer associated with the position of the input communication signal within the first frame;

a first multiplexer controlled by the control circuitry, comprising a first mux input, a second mux input, and a first mux output, the first mux input coupled to the first output, the second mux input coupled to the first interface and operable to receive bits D7 and D6 of the communication signals, the first mux output coupled to the first memory, wherein the first multiplexer is operable to select the first mux input or second mux input in response to one or more bits of a source pointer;

a second multiplexer controlled by the control circuitry, comprising a third mux input, a fourth mux input, and a second mux output, the third mux input coupled to the first output, the fourth mux input coupled to the first interface and operable to receive bits D5 and D4 of the communication signals, the second mux output coupled to the second memory, wherein the second multiplexer is operable to select the third mux input or fourth mux input in response to one or more bits of the source pointer;

a third multiplexer controlled by the control circuitry, comprising a fifth mux input, a sixth mux input, and a third mux output, the fifth mux input coupled to the first output, the sixth mux input coupled to the first interface and operable to receive bits D3 and D2 of the communication signals, the third mux output coupled to the third memory, wherein the third multiplexer is operable to select the fifth mux input or sixth mux input in response to one or more bits of the source pointer; and a fourth multiplexer controlled by the control circuitry, comprising a seventh mux input, an eighth mux input, and a fourth mux output, the seventh mux input coupled to the first output, the eighth mux input coupled to the first interface and operable to receive bits D1 and D0 of the communication signals, the fourth mux output coupled to the fourth memory, wherein the fourth multiplexer is operable to select the seventh mux input or eighth mux input in response to one or more bits of the source pointer.

6. A time slot interchanger, comprising:

a first interface operable to receive a first frame of communication signals, wherein some of the communication signals represent ISDN D-channel signals, each ISDN D-channel signal represented by a first number of data bits and a second number of other bits and wherein some of the communication signals represent DSO signals;

a first memory, second memory, third memory, and fourth memory coupled to the first interface;

control circuitry coupled to the first, second, third, and fourth memories and operable to cause the first number of data bits of each ISDN D-channel signal to be stored in one of the four memories, the control circuitry further operable to cause the memories to output at least some of the stored bits of the communication signals during a second frame period; and a second interface coupled to the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories, further comprising:

a first shifter comprising a first input and a first output, the first input coupled to the first interface, the first output coupled to the first memory, the first shifter controlled by the control circuitry and operable to receive an input communication signal from the first interface and produce the first output comprising two selected bits of the input communication signal, wherein the two selected bits are selected in response to one or more bits of a source pointer associated with the position of the input communication signal within the first frame;

a second shifter comprising a second input and a second output, the second input coupled to the first interface, the second output coupled to the second memory, the second shifter controlled by the control circuitry and operable to receive an input communication signal from the first interface and produce the second output comprising two selected bits of the input communication signal, wherein the two selected bits are selected in response to one or more bits of the source pointer;

a third shifter comprising a third input and a third output, the third input coupled to the first interface, the third output coupled to the third memory, the third shifter controlled by the control circuitry and operable to receive an input communication signal from the first interface and produce the third output comprising two selected bits of the input communication signal, wherein the two selected bits are selected in response to one or more bits of the source pointer; and a fourth shifter comprising a fourth input and a fourth output, the fourth input coupled to the first interface, the fourth output coupled to the fourth memory, the fourth shifter controlled by the control circuitry and operable to receive an input communication signal from the first interface and produce the fourth output comprising two selected bits of the input communication signal, wherein the two selected bits are selected in response to one or more bits of the source pointer.

7. A time slot interchanger, comprising:

a first interface operable to receive a first frame of communication signals, wherein some of the communication signals represent ISDN D-channel signals, each ISDN D-channel signal represented by a first number of data bits and a second number of other bits and wherein some of the communication signals represent DS0 signals;

a first memory, second memory, third memory, and fourth memory coupled to the first interface;

control circuitry coupled to the first, second, third, and fourth memories and operable to cause the first number of data bits of each ISDN D-channel signal to be stored in one of the four memories, the control circuitry further operable to cause the memories to output at least some of the stored bits of the communication signals during a second frame period; and a second interface coupled to the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories, wherein the control circuitry causes the communications signals to be stored in the memories in a random order relative to their position in the first frame and causes the communication signals to be output from memory in consecutive order.

8. A digital communications terminal, comprising:
a subscriber link;
a central office link;
a time slot interchanger, comprising:

a first time slot interchanger interface coupled to the subscriber link and operable to receive a first frame of communication signals, wherein some of the communication signals represent ISDN D-channel signals, each ISDN D-channel signal represented by a first number of data bits and, a second number of other bits and wherein some of the communication signals represent DS0 signals;

a first memory, second memory, third memory, and fourth memory coupled to the first time slot interchanger interface;

control circuitry coupled to the first, second, third, and fourth memories and operable to cause the first number of data bits of each ISDN D-channel signal to be stored in a single one of the four memories, the control circuitry further operable to cause the memories to output at least some of the stored bits of the communication signals during a second frame period; and a second time slot interchanger interface coupled to the central office link and the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories.

9. The digital communications terminal of claim 8, wherein the control circuitry is further operable to cause a DS0 signal to be stored in the first, second, third, and fourth memories, two bits of the DS0 signal per memory.

10. The digital communications terminal of claim 8, wherein the first number of data bits of each communication signal received by the first time slot interchanger interface that represent an ISDN D-channel signal occupy the same bit positions within the communication signal when received by the first time slot interchanger interface as they will occupy in one of the multiplexed signals.

11. A digital communications terminal, comprising:
a subscriber link;
a central office link;
a time slot interchanger, comprising:

a first time slot interchanger interface coupled to the subscriber link and operable to receive a first frame of communication signals, wherein some of the communication signals represent ISDN D-channel signals, each ISDN D-channel signal represented by a first number of data bits and a second number of other bits and wherein some of the communication signals represent DS0 signals;

a first memory, second memory, third memory, and fourth memory coupled to the first time slot interchanger interface;

control circuitry coupled to the first, second, third, and fourth memories and operable to cause the first number of data bits of each ISDN D-channel signal to be stored in one of the four memories, the control circuitry further operable to cause the memories to output at least some of the stored bits of the communication signals during a second frame period; and a second time slot interchanger interface coupled to the central office link and the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories, wherein each of the communication signals comprise bits D0 through D7;

the time slot interchanger further comprising:

a shifter comprising a first input and a first output, the first input coupled to the first time slot interchanger interface, the shifter controlled by the control circuitry and operable to receive an input communication signal from the first time slot interchanger interface and produce the first output comprising two selected bits of the input communication signal, wherein the two selected bits are selected in response to one or more bits of a source pointer associated with the position of the input communication signal within the first frame;

a first multiplexer controlled by the control circuitry, comprising a first mux input, a second mux input, and a first mux output, the first mux input coupled to the first output, the second mux input coupled to the first time slot interchanger interface and operable to receive bits D7 and D6 of the communication signals, the first mux output coupled to the first memory, wherein the first multiplexer is operable to select the first mux input or second mux input in response to one or more bits of a source pointer;

a second multiplexer controlled by the control circuitry, comprising a third mux input, a fourth mux input, and a second mux output, the third mux input coupled to the first output, the fourth mux input coupled to the first time slot interchanger interface and operable to receive bits D5 and D4 of the communication signals, the second mux output coupled to the second memory, wherein the second multiplexer is operable to select the third mux input or fourth mux input in response to one or more bits of the source pointer;

a third multiplexer controlled by the control circuitry, comprising a fifth mux input, a sixth mux input, and a third mux output, the fifth mux input coupled to the first output, the sixth mux input coupled to the first time slot interchanger interface and operable to receive bits D3 and D2 of the communication signals, the third mux output coupled to the third memory, wherein the third multiplexer is operable to select the fifth mux input or sixth mux input in response to one or more bits of the source pointer; and a fourth multiplexer controlled by the control circuitry, comprising a seventh mux input, an eighth mux input, and a fourth mux output, the seventh mux input coupled to the first output, the eighth mux input coupled to the first time slot interchanger interface and operable to receive bits D1 and D0 of the communication signals, the fourth mux output coupled to the fourth memory, wherein the fourth multiplexer is operable to select the seventh mux input or eighth mux input in response to one or more bits of the source pointer.

12. A digital communications terminal, comprising:
a subscriber link;
a central office link;
a time slot interchanger, comprising:

a first time slot interchanger interface coupled to the subscriber link and operable to receive a first frame of communication signals, wherein some of the communication signals represent ISDN D-channel signals, each ISDN D-channel signal represented by a first number of data bits and a second number of other bits and wherein some of the communication signals represent DS0 signals;

a first memory, second memory, third memory, and fourth memory coupled to the first time slot interchanger interface;

control circuitry coupled to the first, second, third, and fourth memories and operable to cause the first number of data bits of each ISDN D-channel signal to be stored in one of the four memories, the control circuitry further operable to cause the memories to output at least some of the stored bits of the communication signals during a second frame period; and a second time slot interchanger interface coupled to the central office link and the first, second, third, and fourth memories and operable to transmit a second frame of communication signals, the second frame of communication signals including multiplexed signals, the multiplexed signals formed by combining the data bits of ISDN D-channel signals output from at least two of the first, second, third, and fourth memories, further comprising:

a first shifter comprising a first input and a first output, the first input coupled to the first time slot interchanger interface, the first output coupled to the first memory, the first shifter controlled by the control circuitry and operable to receive an input communication signal from the first time slot interchanger interface and produce the first output comprising two selected bits of the input communication signal, wherein the two selected bits are selected in response to one or more bits of a source pointer associated with the position of the input communication signal within the first frame;

a second shifter comprising a second input and a second output, the second input coupled to the first time slot interchanger interface, the second output coupled to the second memory, the second shifter controlled by the control circuitry and operable to receive an input communication signal from the first time slot interchanger interface and produce the second output comprising two selected bits of the input communication signal, wherein the two selected bits are selected in response to one or more bits of the source pointer;

a third shifter comprising a third input and a third output, the third input coupled to the first time slot interchanger interface, the third output coupled to the third memory, the third shifter controlled by the control circuitry and operable to receive an input communication signal from the first time slot interchanger interface and produce the third output comprising two selected bits of the input communication signal, wherein the two selected bits are selected in response to one or more bits of the source pointer; and a fourth shifter comprising a fourth input and a fourth output, the fourth input coupled to the first time slot interchanger interface, the fourth output coupled to the fourth memory, the fourth shifter controlled by the control circuitry and operable to receive an input communication signal from the first time slot interchanger interface and produce the fourth output comprising two selected bits of the input communication signal, wherein the two selected bits are selected in response to one or more bits of the source pointer.

13. A method for multiplexing ISDN D-channel signals into multiplexed signals, comprising:

receiving a frame of communication signals, wherein some of the communication signals represent ISDN D-channel signals, each ISDN D-channel signal represented by a first number of data bits and a second number of other bits;

storing the first number of data bits of communication signals representing ISDN D-channel signals in a single one of four memories—a first memory, second memory, third memory, or fourth memory, the storing step occurring during a first frame period;

assembling multiplexed signals, a multiplexed signal comprising a multiplexed combination of the data bits of ISDN D-channel signals from the frame of communication signals, the multiplexed signals assembled by storing the data bits of at least two ISDN D-channel signals, each set of data bits stored at the same memory address but in a separate one of the first, second, third or fourth memories.

14. The method of claim 13, further comprising:

storing DSO signals, comprising bits D0–D7 and contained in the frame of communication signals by storing bits D7 and D6 of a DSO signal at a memory address in the first memory, storing bits D5 and D4 of the DSO signal at the same memory address in the second memory, storing bits D3 and D2 of the DSO signal at the same memory address in the third memory, and storing bits D1 and D0 of the DSO signal at the same memory address in the fourth memory.

15. The method of claim 13, wherein the first number of data bits of each communication signal received by the first interface that represent an ISDN D-channel signal occupy the same bit positions within the communication signal when received by the first interface as they will occupy in one of the multiplexed signals.

16. The method of claim 13, wherein the received communications signals are stored in the memories in a random order relative to their position in the frame and output from the memory in consecutive order.

17. A method for multiplexing ISDN D-channel signals into multiplexed signals, comprising:

receiving a frame of communication signals, wherein some of the communication signals represent ISDN D-channel signals, each ISDN D-channel signal represented by a first number of data bits and a second number of other bits;

storing the first number of data bits of communication signals representing ISDN D-channel signals in one of four memories—a first memory, second memory, third memory, or fourth memory, the storing step occurring during a first frame period;

assembling multiplexed signals, a multiplexed signal comprising a multiplexed combination of the data bits of ISDN D-channel signals from the frame of communication signals, the multiplexed signals assembled by storing the data bits of at least two ISDN D-channel signals, each set of data bits stored at the same memory address but in a separate one of the first, second, third or fourth memories, further comprising:

shifting a received communication signal to produce a first output comprising two selected bits of the received communication signal, wherein the two selected bits are selected in response to one or more bits of a source pointer associated with the position of the received communication signal within the first frame; and multiplexing the input to each of the four memories, the input to each memory comprising either the first output or two bits of the received communication signal.

18. The method of claim 17, further comprising:

storing DSO signals, comprising bits D0–D7 and contained in the frame of communication signals by storing bits D7 and D6 of a DSO signal at a memory address in the first memory, storing bits D5 and D4 of the DSO signal at the same memory address in the second memory, storing bits D3 and D2 of the DSO signal at the same memory address in the third memory, and storing bits D1 and D0 of the DSO signal at the same memory address in the fourth memory.

19. A method for multiplexing ISDN D-channel signals into multiplexed signals, comprising:

receiving a frame of communication signals, wherein some of the communication signals represent ISDN D-channel signals, each ISDN D-channel signal represented by a first number of data bits and a second number of other bits;

storing the first number of data bits of communication signals representing ISDN D-channel signals in one of four memories—a first memory, second memory third memory, or fourth memory, the storing step occurring during a first frame period;

assembling multiplexed signals, a multiplexed signal comprising a multiplexed combination of the data bits of ISDN D-channel signals from the frame of communication signals, the multiplexed signals assembled by storing the data bits of at least two ISDN D-channel signals, each set of data bits stored at the same memory address but in a separate one of the first, second, third or fourth memories, further comprising:

shifting a received communication signal to produce a first output comprising two selected bits of the received communication signal, wherein the two selected bits are selected in response to one or more bits of a source pointer associated with the position of the received communication signal within the first frame, the first memory operable to receive the first output;

shifting a received communication signal to produce a second output comprising two selected bits of the received communication signal, wherein the two selected bits are selected in response to one or more bits of a source pointer associated with the position of the received communication signal within the first frame, the second memory operable to receive the second output;

shifting a received communication signal to produce a third output comprising two selected bits of the received communication signal, wherein the two selected bits are selected in response to one or more bits of a source pointer associated with the position of the received communication signal within the first frame, the third memory operable to receive the third output; and shifting a received communication signal to produce a fourth output comprising two selected bits of the received communication signal, wherein the two selected bits are selected in response to one or more bits of a source pointer associated with the position of the received communication signal within the first frame, the fourth memory operable to receive the fourth output.

20. The method of claim 19, further comprising:

storing DSO signals, comprising bits D0–D7 and contained in the frame of communication signals by storing bits D7 and D6 of a DSO signal at a memory address in the first memory, storing bits D5 and D4 of the DSO signal at the same memory address in the second memory, storing bits D3 and D2 of the DSO signal at the same memory address in the third memory, and storing bits D1 and D0 of the DSO signal at the same memory address in the fourth memory.

* * * * *